(12) United States Patent
Dietrich et al.

(10) Patent No.: US 11,097,646 B2
(45) Date of Patent: Aug. 24, 2021

(54) SECURING AND BOTTLE OPENING SYSTEM FOR A VEHICLE

(71) Applicant: Ford Global Technologies, LLC, Dearborn, MI (US)

(72) Inventors: Sean Dietrich, Taylor, MI (US); Forrest Eddings, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 16/546,956

(22) Filed: Aug. 21, 2019

(65) Prior Publication Data
US 2021/0053480 A1   Feb. 25, 2021

(51) Int. Cl.
*B60P 7/08* (2006.01)
*B67B 7/16* (2006.01)

(52) U.S. Cl.
CPC .............. *B60P 7/0807* (2013.01); *B67B 7/16* (2013.01)

(58) Field of Classification Search
CPC .......... B60P 7/135; B60P 7/0892; B60P 7/15; B60P 7/14; B60P 3/077; B60P 7/0815; B60P 7/12; B60P 3/40; B60P 7/08
USPC ... 410/121, 97, 94, 129, 143, 122, 150, 155, 410/89, 96, 87, 49, 4, 39
See application file for complete search history.

(56) References Cited

U.S. PATENT DOCUMENTS

| | | | | |
|---|---|---|---|---|
| 2,870,722 A * | 1/1959 | Oakley | ................ | B61D 45/002 410/109 |
| 2,996,938 A * | 8/1961 | Holtzclaw | ................. | B67B 7/16 81/3.09 |
| 4,169,415 A * | 10/1979 | Winsor | .................. | B61D 17/08 296/39.1 |
| 5,772,370 A * | 6/1998 | Moore | .................... | B60R 7/005 296/37.16 |
| 8,136,708 B2 | 3/2012 | Sautter et al. | | |
| 9,745,003 B2 * | 8/2017 | Kloepfer | .................. | B60J 7/104 |
| 10,160,396 B2 * | 12/2018 | Stojkovic | ........... | B62D 33/0273 |
| 10,160,693 B2 | 12/2018 | Stojkovic et al. | | |
| 2019/0210509 A1 * | 7/2019 | Hemphill | .............. | B60P 7/0807 |
| 2020/0166073 A1 * | 5/2020 | Medina Luna | ......... | F16B 45/02 |

FOREIGN PATENT DOCUMENTS

EP    1974966    10/2008

* cited by examiner

*Primary Examiner* — D Glenn Dayoan
*Assistant Examiner* — Sunsurraye Westbrook
(74) *Attorney, Agent, or Firm* — David Coppiellie, Esq.; Carlson, Gaskey & Olds, P.C.

(57) ABSTRACT

A securing and opening system for a vehicle includes, among other things, a structural metallic member of a vehicle, and a bottle opener provided by an opening in the structural metallic member.

18 Claims, 4 Drawing Sheets

SECURING AND BOTTLE OPENING SYSTEM FOR A VEHICLE

TECHNICAL FIELD

This disclosure relates generally to a securing system within a vehicle and, more particularly, to a securing system that incorporates a bottle opener.

BACKGROUND

Vehicles can carry cargo within a cargo area. Often, the cargo can be secured to the vehicle. The cargo can be tied down to the vehicle, for example.

SUMMARY

A securing and opening system for a vehicle, according to an exemplary aspect of the present disclosure includes, among other things, a structural metallic member of a vehicle, and a bottle opener provided by an opening in the structural metallic member.

In a further embodiment of the foregoing system, the opening provides an anchoring location for securing cargo.

In a further non-limiting embodiment of any of the foregoing systems, the opening is vertically above a beltline of a vehicle.

In a further non-limiting embodiment of any of the foregoing systems, the opening includes a first opening and a second opening.

In a further non-limiting embodiment of any of the foregoing systems, the second opening is vertically beneath the first opening.

In a further non-limiting embodiment of any of the foregoing systems, the first opening includes a long side vertically offset from a short side. Further, the second opening includes a long side vertically offset from a short side.

In a further non-limiting embodiment of any of the foregoing systems, the second opening includes a long side vertically above a short side. The short side includes a tab that is configured to fit beneath a bottle cap.

In a further non-limiting embodiment of any of the foregoing systems, the first opening is configured to receive a first portion of a hook of an anchoring device. The second opening is configured to receive a second portion of the hook of the anchoring device.

In a further non-limiting embodiment of any of the foregoing systems, the structural metallic member is a structural pillar of a vehicle.

In a further non-limiting embodiment of any of the foregoing systems, the opening is provided within a surface of the structural pillar that faces a cargo area of the vehicle.

In a further non-limiting embodiment of any of the foregoing systems, the structural metallic member is a hydroformed tube.

A method of using a securing and opening system of a vehicle according to another exemplary aspect of the present disclosure includes, among other things, placing cargo within a cargo area of a vehicle, and securing the cargo using an opening within a structural metallic member of the vehicle. The opening provides a bottle opener.

In another example of the foregoing method, the opening is vertically above a beltline of the vehicle.

Another example of any of the foregoing methods includes laser cutting the opening within the structural metallic member.

In another example of any of the foregoing methods, the opening is within a surface of the structural metallic member that faces a cargo area of the vehicle.

In another example of any of the foregoing methods, the structural metallic member is part of a cage system of the vehicle.

In another example of any of the foregoing methods, the opening comprises a first opening and a second opening.

In another example of any of the foregoing methods, the securing comprises extending a hook of an anchoring device through both the first opening and the second opening.

In another example of any of the foregoing methods, the second opening includes a long side vertically above a short side. The short side includes a tab that is configured to fit beneath a bottle cap.

In another example of any of the foregoing methods, the first opening includes a long side vertically offset from a short side. The second opening includes a long side vertically offset from a short side.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a securing and opening system for a vehicle. Cargo can be secured to the vehicle through the securing and opening system. The securing and opening system can also be used to open bottles. The securing and opening system is incorporated into a structural metallic member of the vehicle.

Figure 1:
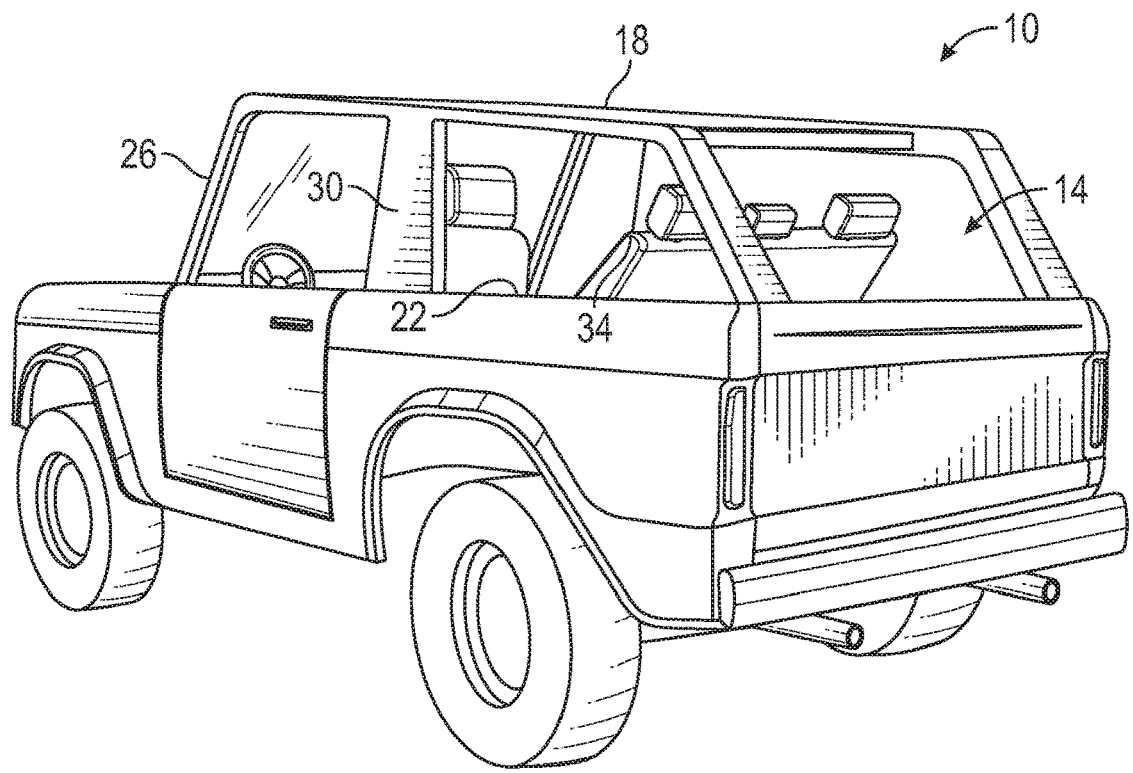
FIG. 1 illustrates a rear perspective view of a vehicle having a cargo area.

With reference to FIG. 1, a vehicle 10 includes a cargo area 14. A user can load cargo into the cargo area 14 for transport by the vehicle 10.

The vehicle 10 further includes a cage system 18. The cage system 18 extends vertically above a beltline 22 of the vehicle 10, and above interior trim of the vehicle 10. The cage system 18 generally comprises A-pillars 26, B-pillars 30, and C or D-pillars 34. The pillars 34 are the aftmost structural pillars of the vehicle 10. An operator of the vehicle 10 can optionally secure a cover (not shown) relative to the cage system 18 to substantially enclose a passenger compartment of the vehicle 10. Alternative, the operator can operate the vehicle 10 with no cover for an open air experience as shown in FIG. 1.

In the exemplary embodiment, metallic members provide the cage system 18. Metallic, for purposes of this disclosure, includes both metal members and metal alloy members. In the exemplary embodiment, the cage system 18 is provided by hydroformed metallic tubes. A person having skill in this art and the benefit of this disclosure would be able to structurally distinguish hydroformed tubes from other types of tubes, such as extruded tubes. In the exemplary embodiment, the hydroform tube is a boron based steel, which has a relatively high yield point and very limited elongation. The material will not substantially deform after use as would any other material in the vehicle 10, such as a skin panels, trim components, or polymer-based components.

The metallic members of the cage system 18 are exposed, which means that areas of the metallic members are not covered by trim. Because the metallic members are exposed, an observer near or within the vehicle 10 would see the cage system 18. Accordingly, the metallic members of the cage system 18 can be painted.

The metallic members of the cage system 18 are structural members of the vehicle 10, not trim components. Structural members, as known, support vehicle weight and can absorb energy and road shock.

Figure 2:
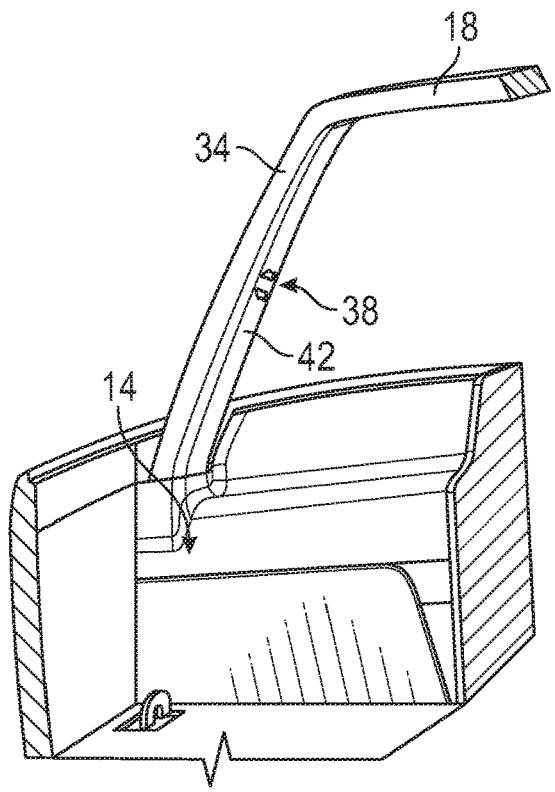
FIG. 2 illustrates a portion of the vehicle of FIG. 1 viewed from within the cargo area.

With reference now to FIG. 2, the C-pillar 34 on the driver side of the vehicle 10 includes a securing and opening system 38. The securing and opening system 38 is within a surface 42 that faces the cargo area 14. Thus, when the vehicle 10 is viewed from the rear, the securing and opening system 38 is hidden from view.

Figure 3A:
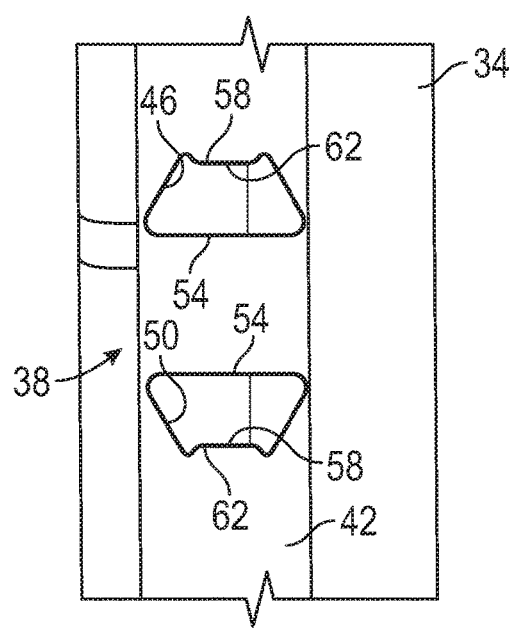
FIG. 3A illustrates a close-up view of a securing and opening system from FIG. 2 according to an exemplary aspect of the present disclosure.
Figure 3B:
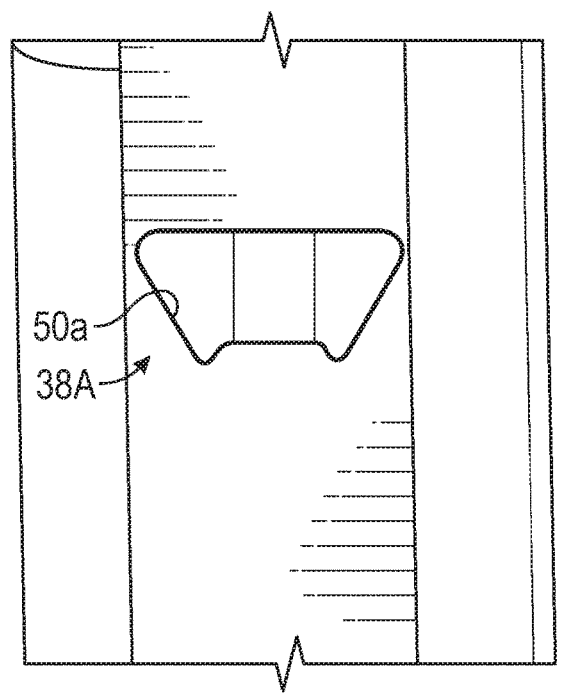
FIG. 3B illustrates an securing and opening system according to another exemplary embodiment of the present disclosure

Referring the FIG. 3A, the securing and opening system 38 includes a first opening 46 and a second opening 50. The first opening 46 is vertically above the second opening 50. Vertical, for purposes of this disclosure is with reference to ground and the ordinary orientation of the vehicle 10 during operation. In another example, a securing and opening system 38A is provided by a single opening 50A as show in FIG. 3B.

The openings 46 and 50, in the exemplary embodiment, are laser cut within the surface 42 of the C-pillar 34. The openings 46 and 50 each taper vertically from a long side 54 to a short side 58. The long side 54 of the first opening 46 is vertically beneath the short side 58. The long side 54 of the second opening 50 is vertically above the short side 58.

Figure 4:
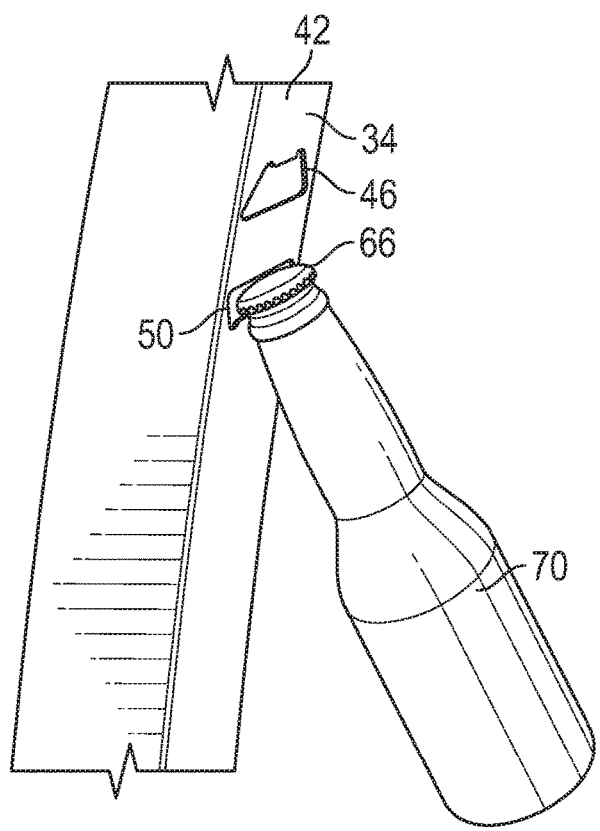
FIG. 4 illustrates a perspective view of the securing and opening system of FIG. 3A utilized to open a bottle.

For each of the openings 46 and 50, the short sides 58 incorporate a tooth 62. With reference to FIG. 4, the tooth 62 can fit beneath a cap 66 of a bottle 70. A user can pry the cap 66 from the bottle 70 utilizing the tooth 62 and the long side 54. The securing and opening system 38 thus provides a bottle opener. The user can utilize the bottle opener when tailgating out of the vehicle 10, for example. As the bottle opener is incorporated into the surface 42, which faces partially downward, the bottle 70 can be opened without spillage.

The securing and opening system 38 can provide an anchoring location (or tie down) for anchoring devices that secure cargo. Anchoring devices can include bungee cords, cargo nets, and tie-downs straps such as rope, string, cable, wire, cord, or chains. Other types of anchoring devices could be used in other examples.

Figure 5:
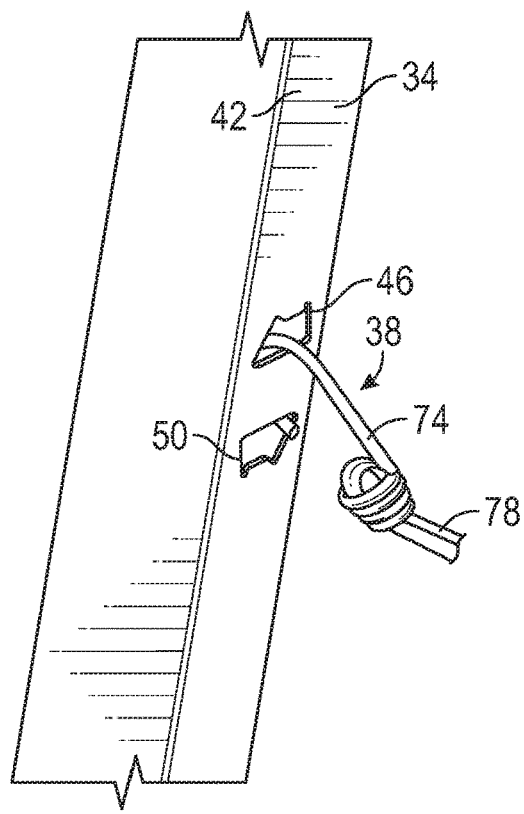
FIG. 5 illustrates a bungee cord coupled to the securing and opening system of FIG. 3A.

FIG. 5 illustrates how a hook 74 of an anchoring device, here a bungee 78, could be coupled to the securing and opening system 38. As shown, the hook 74 extends through both the first opening 46 and the second opening 50, which anchors the bungee to the C-pillar 34. The bungee 78 can then be used to secure cargo relative to the vehicle 10. If the securing and opening system 38A is used, the hook 74 can extend through just the opening 50A.

Figure 6:
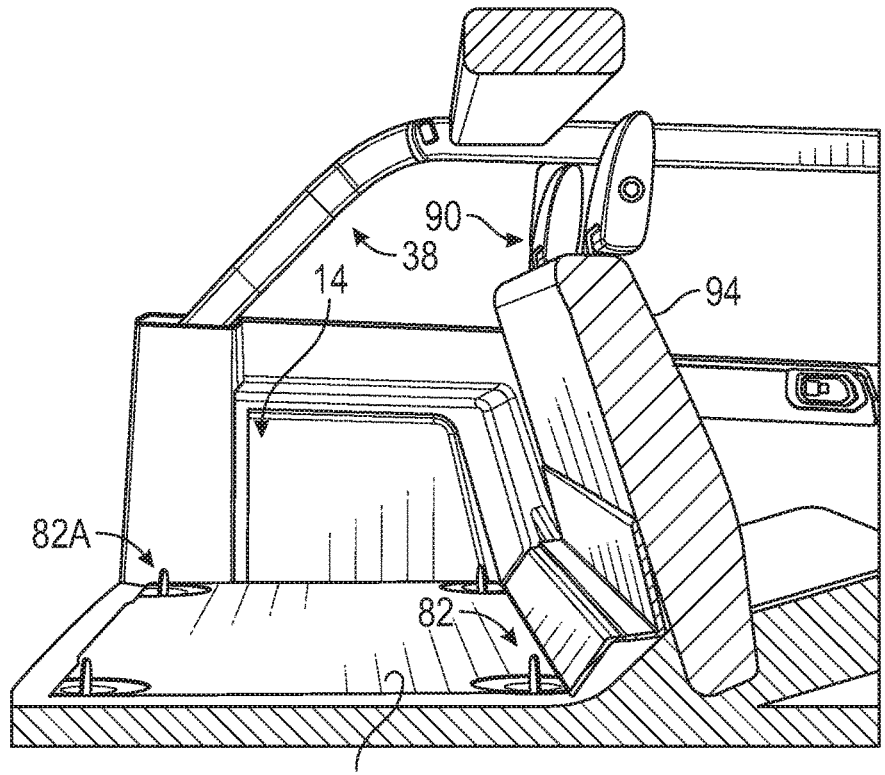
FIG. 6 illustrates a sectioned, side view of a portion of the vehicle of FIG. 1, which shows the cargo area of the vehicle of FIG. 1.

With reference to FIG. 6, the securing and opening assembly 38 can be used in connection with other anchoring locations of the vehicle 10, such as anchoring systems 82 within a floor 86 of the cargo area 14, or anchoring locations 90 provided by seats 94 of the vehicle 10.

Figure 7:
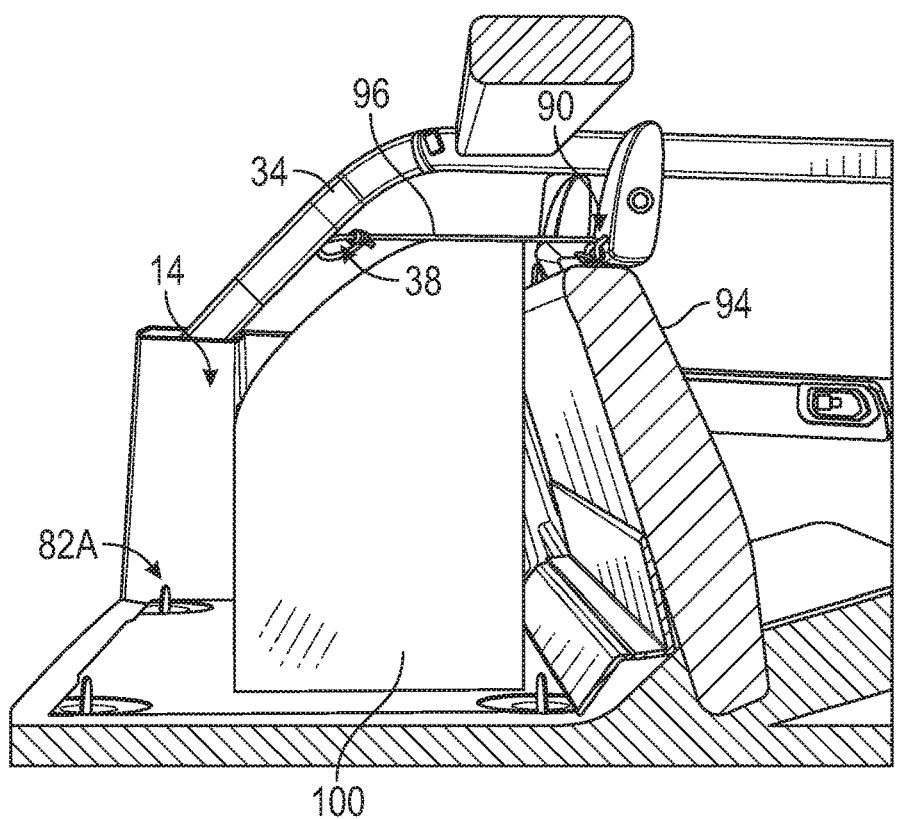
FIG. 7 illustrates a bicycle secured to the vehicle through the securing and opening system of FIG. 3A.

FIG. 7 illustrates an example of how the securing and opening system 38 can be used with one of the anchoring systems 90 provided by the seats 94. The securing and opening system 38 provides a first anchoring location for a rope 96. Another end of the rope 96 is secured to the anchoring location provided by one of the seats 94. With the ends of the rope 96 secured, the rope 96 can be used to secure cargo 100 within the cargo area 14. The cargo 100 could be luggage, for example.

Figure 8:
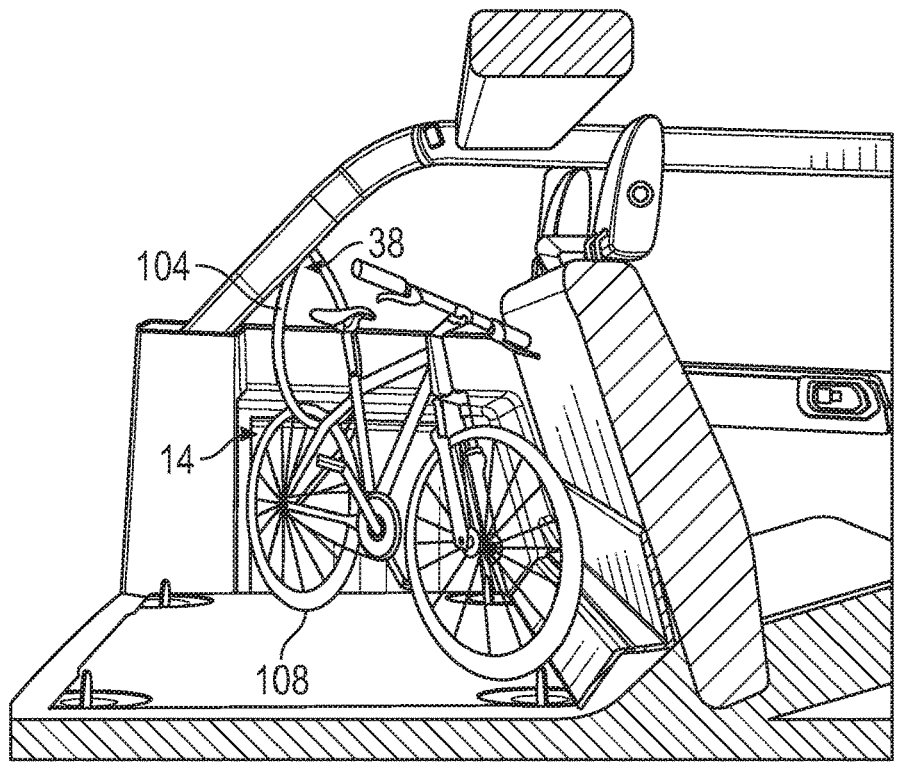
FIG. 8 illustrates a package secured to the vehicle through the securing and opening system of FIG. 3A.

The securing and opening system 38 could be utilized to secure cargo without interfacing with other anchoring systems. For example, with reference to FIG. 8, the securing and opening system 38 is providing an anchoring location for a bicycle lock 104 that secures and locks a bicycle 108 within the cargo area 14. Securing the bicycle 108 within the cargo area 14 may be particularly useful when the vehicle 10 is utilized without a cover as the cargo area 14 is accessible from outside the vehicle 10.

Features of the disclosed examples include a securing and opening system that is incorporated into structural metallic member of a vehicle. The securing and opening system is above a beltline of a vehicle and above trim of the vehicle. The securing and opening system is thus easily visible to a user. The securing and opening system can be incorporated into existing structures of the vehicle, which thereby keeps costs relatively controlled.

In the past, vehicles have incorporated bottle openers, but these openers are separate components that must be secured within the vehicle. Incorporating the securing and opening system within the structural metallic member avoids added part complexity introduced by such bottle openers. The vehicle of the example disclosure includes a tie-down and bottle opener that is integrated into structure of the vehicle.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A securing and opening system for a vehicle, comprising:
   a structural metallic member of a vehicle; and
   a bottle opener at least partially provided by at least one opening in the structural metallic member,
      wherein the at least one opening provides an anchoring location for securing cargo,
      wherein the structural metallic member defines an entire perimeter of the at least one opening such that the structural metallic member extends circumferentially continuously about the at least one opening.

2. The vehicle assembly of claim 1, wherein the at least one opening is vertically above a beltline of a vehicle and is spaced a distance vertically from the beltline.

3. The vehicle assembly of claim 1, wherein the at least one opening includes a first opening and a second opening.

4. The vehicle assembly of claim 3, wherein the second opening is vertically beneath the first opening.

5. The vehicle assembly of claim 3, wherein the first opening includes a long side vertically offset from a short side, wherein the second opening includes a long side vertically offset from a short side.

6. The vehicle assembly of claim 3, wherein the second opening includes a long side vertically above a short side, wherein the short side includes a tab that is configured to fit beneath a bottle cap.

7. The vehicle assembly of claim 3, wherein the first opening is configured to receive a first portion of a hook of an anchoring device, and the second opening is configured to receive a second portion of the hook of the anchoring device.

8. A securing and opening system for a vehicle, comprising:
   a structural metallic member of a vehicle; and
   a bottle opener at least partially provided by at least one opening in the structural metallic member, wherein the structural metallic member is a structural pillar of a vehicle.

9. The vehicle assembly of claim 8, wherein the opening is provided within a surface of the structural pillar that faces a cargo area of the vehicle.

10. The vehicle assembly of claim 1, wherein the structural metallic member is a hydroformed tube.

11. A method of using a securing and opening system of a vehicle, comprising:
    placing cargo within a cargo area of a vehicle; and
    securing the cargo using at least one opening within a structural metallic member of the vehicle, the at least one opening at least partially providing a bottle opener, wherein the structural metallic member is part of a cage system of the vehicle.

12. The method of claim 11, wherein the at least one opening is vertically above a beltline of the vehicle and is spaced a distance vertically from the beltline.

13. The method of claim 11, further comprising laser cutting the at least one opening within the structural metallic member.

14. The method of claim 11, wherein the at least one opening is within a surface of the structural metallic member that faces a cargo area of the vehicle, wherein the structural metallic member defines an entire perimeter of the at least one opening such that the structural metallic member extends circumferentially continuously about the at least one opening.

15. The method of claim 11, wherein the at least one opening comprises a first opening and a second opening.

16. The method of claim 15, wherein the securing comprises extending a hook of an anchoring device through both the first opening and the second opening.

17. The method of claim 15, wherein the second opening includes a long side vertically above a short side, wherein the short side includes a tab that is configured to fit beneath a bottle cap.

18. The method of claim 15, wherein the first opening includes a long side vertically offset from a short side, wherein the second opening includes a long side vertically offset from a short side.

* * * * *